US 6,608,837 B1

(12) United States Patent
Brodigan

(10) Patent No.: US 6,608,837 B1
(45) Date of Patent: Aug. 19, 2003

(54) DATA CAROUSEL FRANCHISE PROVISIONING

(75) Inventor: Donald L. Brodigan, Broomfield, CO (US)

(73) Assignee: Qwest Communications International, Inc., Denver, CO (US)

( * ) Notice: Subject to any disclaimer, the term of this patent is extended or adjusted under 35 U.S.C. 154(b) by 0 days.

(21) Appl. No.: 09/168,541

(22) Filed: Oct. 8, 1998

(51) Int. Cl.$^7$ ................................................. H04J 3/26
(52) U.S. Cl. ..................................... 370/432; 370/395.1
(58) Field of Search ............................. 370/432, 389, 370/395.1, 396, 397, 400, 401, 409, 353, 354, 355, 356, 395.2, 486, 487, 493, 498; 709/203, 206, 352

(56) References Cited

U.S. PATENT DOCUMENTS

| | | | | |
|---|---|---|---|---|
| 5,247,347 A | * | 9/1993 | Litteral et al. ............... 725/114 |
| 5,253,275 A | * | 10/1993 | Yurt et al. ..................... 375/240 |
| 5,583,920 A | * | 12/1996 | Wheeler, Jr. .............. 379/88.01 |
| 5,635,979 A | * | 6/1997 | Kostreski et al. ............ 725/132 |
| 5,666,293 A | * | 9/1997 | Metz et al. ................... 709/220 |
| 5,917,537 A | * | 6/1999 | Lightfoot et al. ............ 370/401 |
| 5,935,209 A | * | 8/1999 | Budhraja et al. ............ 709/223 |
| 6,081,519 A | * | 6/2000 | Petler .......................... 370/356 |
| 6,154,467 A | * | 11/2000 | Hager et al. ................. 370/467 |
| 6,282,189 B1 | * | 8/2001 | Eames ......................... 370/352 |
| 6,493,680 B2 | * | 12/2002 | Logan et al. .................. 705/34 |

* cited by examiner

Primary Examiner—Douglas Olms
Assistant Examiner—Brian Nguyen
(74) Attorney, Agent, or Firm—Townsend and Townsend and Crew LLP

(57) ABSTRACT

Data is provisioned from a data carousel in the head end of a broadband data distribution system covering a plurality of franchises. The data destination is based on the franchise to which a customer belongs. The distribution system includes at least one broadband digital terminal for providing a point-to-multipoint connection between the data carousel and the customer. A franchise permanent virtual circuit is established between the data carousel and the BDT for each franchise served by the BDT. Each franchise PVC carries franchise-specific data. A sign on request is received from the customer over a customer PVC. The sign on request is used to determine to which franchise the customer belongs. A soft PVC is established in the BDT between the customer PVC and the franchise PVC corresponding to the determined franchise, thereby allowing franchise-specific information to be delivered to the customer.

19 Claims, 4 Drawing Sheets

DATA CAROUSEL FRANCHISE PROVISIONING

TECHNICAL FIELD

The present invention relates to distributing franchise-dependent data in a broadband broadcast system.

BACKGROUND ART

Broadband broadcast systems are used to distribute high bandwidth data, such as video programming, from a head end to customers distributed over a wide geographic area. Most programming distributed over the broadband system is available to all customers connected to the system. However, some data should be received only by customers within a certain franchise. Types of data which may be franchise-dependent include electronic programming guides (EPGs); public, education, and government (PEG) programming information; and pay-per-view (PPV) selections.

Typically, customer equipment such as televisions and computers is connected to the broadband system through a set-top box (STB). In analog broadband distribution systems, franchise-dependent data is modulated and transmitted across the entire broadband system. The STB is programmed to filter out franchise-dependent data that should not be received by the customer. Typically, STBs are programmed with software or codes to provide the necessary filtering, viewing option selections, and billing procedures.

One difficulty with this technique is that an STB must be programmed prior to use by a customer. Further, the STB may have to be retrieved if franchise-dependent programming is required in the field. Another difficulty is that, if the STB is taken to another location outside of the programmed franchise, the STB will continue to provide data for the originally programmed franchise.

Recently, digital broadband broadcast systems have been implemented. Typically, data is transmitted using asynchronous transfer mode (ATM) compatible equipment. ATM is a wideband, low delay, packet-like switching and multiplexing technology that allows flexible use of transmission bandwidth. Permanent virtual circuits (PVCs) are established between the broadcasting head end and broadband digital terminals (BDTs) geographically dispersed throughout the distribution system. PVCs are also established between each customer and the BDT which serves the customer. These PVCs function as dedicated point-to-point links.

The switch from analog broadband distribution systems to digital broadband distribution systems provides the opportunity for many improvements. Among these is the ability to provide franchise-dependent data to a customer. This delivery of franchise-dependent data should be based on the location of the customer and not on programming of the customer STB. STBs should be able to be installed at a customer site without extensive reprogramming. Also, each STB should be able to be relocated to a customer in a different franchise without reprogramming.

SUMMARY OF THE INVENTION

It is an object of the present invention to provide delivery of franchise-dependent data over a digital broadband distribution system to a customer.

Another object of the present invention is to provide franchise-dependent programming based on customer location.

Still another object of the present invention is to provide the ability to connect STBs to the broadband network without extensive reprogramming.

Yet another object of the present invention is to provide the ability to relocate an STB to a customer in a different franchise without having to reprogram the STB.

A further object of the present invention is to provide the ability to update software in any STB connected to the broadband distribution network based on the franchise in which the STB is located.

In carrying out the above objects and other objects and features of the present invention, a method is provided for provisioning data from a data carousel in the head end of a broadband information distribution system covering a plurality of franchises. The data destination is based on the franchise to which a customer belongs. The distribution system includes at least one BDT for providing a point-to-multipoint connection between the data carousel and the customer. The method includes establishing a franchise PVC between the data carousel and the BDT for each franchise served by the BDT. A sign on request is received from the customer over a customer PVC between the customer and the BDT. The franchise to which the customer belongs is determined based on the sign on request. A soft PVC in the BDT is established between the customer PVC and the franchise PVC corresponding to the determined franchise.

In an embodiment of the present invention, the data includes at least one of an EPG for each franchise, PEG programming information for each franchise, and PPV selections for each franchise. In another embodiment of the present invention having data delivered through an STB within the customer premises, the data includes at least one file to be downloaded to the STB. The file is based on the franchise to which the customer belongs.

In still another embodiment of the present invention, the franchise PVC is identified by a unique franchise service handle.

In yet another embodiment of the present invention, the customer PVC is established through a universal access multiplexer (USAM) in communication with the BDT. The customer is connected to the USAM through a port having a port number. The method includes establishing a profile for each customer. The profile includes the USAM and the port number to which the customer is connected associated with the franchise to which the customer belongs. In a refinement, determining to which franchise the customer belongs includes finding the profile containing the USAM and port number received in the sign on request.

A broadband system for provisioning information to customers is also provided. The system includes a head end having a data carousel. The data carousel provides franchise-based information. The system also includes at least one BDT that can support a franchise PVC between the data carousel and the BDT for each franchise served by the BDT. The BDT can also establish a PVC between each customer served by the BDT and the BDT. A sign on request is received by the BDT from a requesting customer over the customer PVC. The BDT determines to which franchise the requesting customer belongs based on the sign on request. The BDT establishes a soft PVC between the requesting customer PVC and the franchise PVC corresponding to the determined franchise.

A broadband digital terminal for provisioning franchise-dependent information to customers is also provided. The BDT includes at least one input port to support a franchise PVC for receiving franchise-dependent information from the data carousel. Output ports in the BDT support a plurality of customer PVCs, each customer PVC serving at least one customer. An ATM switch can form point-to-multipoint connections between the input port and at least one output port. A control unit in the BDT receives a sign on request from a requesting customer over the customer PVC, determines to which franchise the requesting customer belongs based on the sign on request, and sets the ATM switch to establish a soft PVC between the requesting customer PVC and the franchise PVC corresponding to the determined franchise.

The above objects and other objects, features, and advantages of the present invention are readily apparent from the following detailed description of the best modes for carrying out the invention when taken in connection with the accompanying drawings.

BEST MODES FOR CARRYING OUT THE INVENTION

Figure 1:
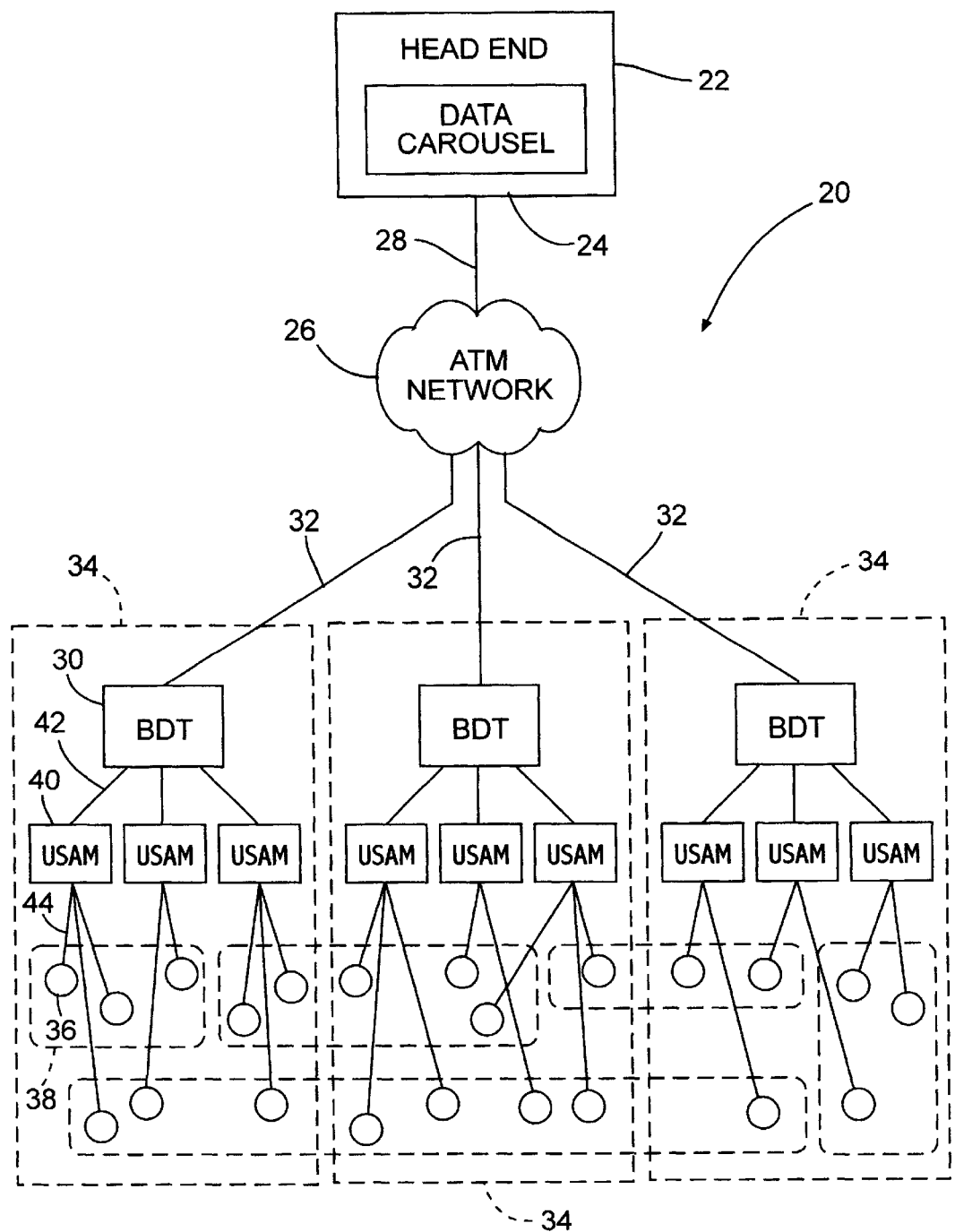
FIG. 1 is a block diagram of a digital broadband distribution system that may be used to implement the present invention.

Referring now to FIG. 1, a block diagram of a digital broadband distribution system that may be used to implement the present invention is shown. Broadband communication system 20 includes at least one head end 22 for provisioning data. Each head end 22 may belong to a different data provider. Each head end 22 includes at least one data carousel 24. Data carousel 24 provides franchise-dependent data including electronic programming guides (EPGs); public, education, and government (PEG) programming information; and pay-per-view (PPV) selections. Data carousel 24 may also transmit software upgrades for set-top boxes (STBs). Data such as EPGs, PEG information, PPV selections, and STB software upgrades may be sequentially broadcast in a continuous loop with updates provided in a manner that does not require broadcasting to cease. Data carousel 24 is connected to ATM network 26 through data carousel link 28. Link 28 may be an optical carrier such as OC-3c or OC-12c or may be a digital service link such as DS3. A plurality of broadband digital terminals (BDTs) 30, also known as host digital terminals (HDTs), are also connected to ATM network 26 through BDT links 32. Links 32 are generally similar in type to links 28.

Typically, each BDT 30 is housed in a telephone system central office and serves customers, one of which is indicated by 36, in the same distribution area 34 served by the central office. However, customers 36 are grouped in franchises, one of which is indicated by 38, which may not correspond with distribution areas 34. Therefore, each BDT 30 may be serving customers 36 from more than one franchise 38.

Each customer 36 is connected to BDT 30 through a switching and conversion device such as a universal service access multiplexer (USAM), one of which is shown by 40, also known as a broadband network unit (BNU) or an optical data unit (ODU). USAM 40 is connected to BDT 30 through ATM compatible link 42. Customer 36 is connected to USAM 40 through drop 44 which may be coaxial cable, twisted copper pair, fiber, or the like. USAM 40 converts the ATM signal arriving on link 42 into a physical form compatible with drop 44.

Figure 2:
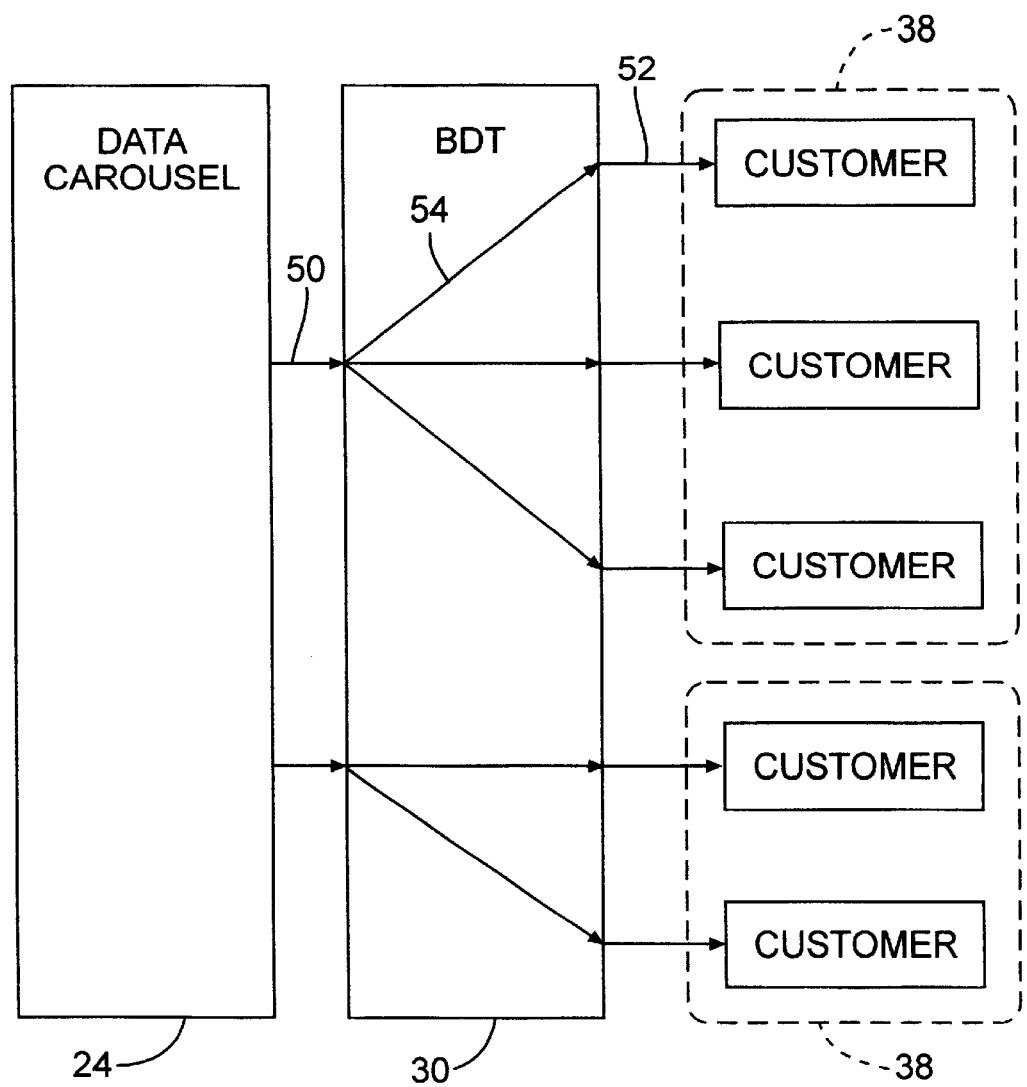
FIG. 2 is a block diagram illustrating virtual connections for a BDT according to the present invention.

Referring now to FIG. 2, a block diagram illustrating virtual connections for a BDT according to the present invention is shown. A permanent virtual circuit (PVC), one of which is indicated by 50, is established between data carousel 24 and BDT 30 for each franchise 38 serviced by BDT 30. In a preferred embodiment, each franchise PVC 50 is assigned a unique service handle. For example, data carousel 24 in broadband communication system 20 having 100 franchises 38 may be assigned service handles having numbers ranging from 2000 to 2099. If communication system 20 includes multiple providers, each provider may receive a unique set of service handles.

Each customer 36 connects to BDT 30 through a customer PVC, one of which is indicated by 52. Customer PVC 52 has a well known virtual path identifier (VPI) and virtual channel identifier (VCI). When customer 36 STB is initialized, a sign on message is sent over customer PVC 52 to BDT 30. BDT 30 determines to which franchise 38 customer 36 belongs based on the sign on request. BDT 30 then establishes soft PVC 54 between customer PVC 52 and the franchise PVC 50 corresponding to the determined franchise 38.

Figure 3:
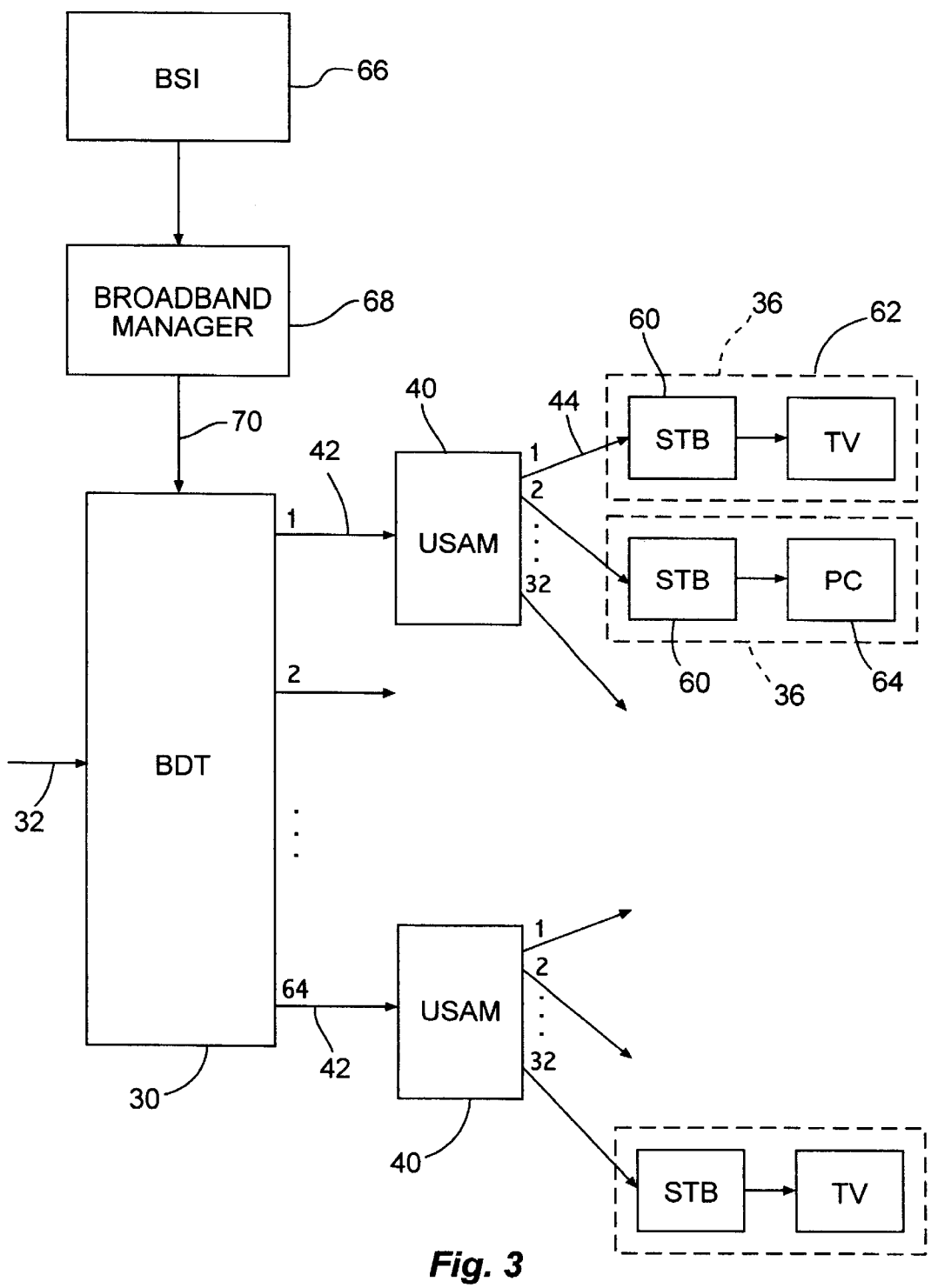
FIG. 3 is a block diagram of components that may be used to implement embodiments of the present invention.

Referring now to FIG. 3, a block diagram of components that may be used to implement embodiments of the present invention are shown. BDT 30 supports multiple franchise PVCs 50 over BDT link 32. Typically, BDT 30 supports up to 64 USAMs 40, each connected through ATM link 42. Each USAM 40 typically has 32 numbered ports, each port providing one drop 44 to customer 36. BDT 30 and USAM 40 may be obtained from Next Level Communications, Inc. of Rohnert Calif. Each customer 36 has at least one STB 60 used to interface customer equipment, such as television 62 or computer 64, to broadband communication system 20. Typically, STB 60 is a separate box. However, STB 60 may be an integrated circuit card insertable into equipment 62,64 or may be built into equipment 62,64.

Each provider in broadband communication system 20 has business system interface (BSI) 66 from where drop 44 for customer 36 is provisioned. Customer records and billing information for each customer 36, based on service entitlements and taxing requirements for franchise 38, are also handled by BSI 66. BSI 66 is established and operated by a company such as CSG Systems International, Inc. of Denver Colo. BSI 66 is connected to BDT 30 through broadband manager 68. BSI 66 communicates with broadband manager 68 using a protocol such as the ACC4000D developed by Jerrold, Inc. Broadband manager 68 communicates with BDT 30 through TCP/IP link 70. Broadband manager 68 may be a View 2 Broadband Manager from Next Level Communications, Inc.

Referring now to FIGS. 2 and 3, when customer 36 first orders service from communication system 20, an Add New Set-top command is issued by BSI 66. This command includes the port number on USAM 40 to which drop 44 is connected. This command also includes the franchise 38 to which customer 36 belongs. Subsequently, when STB 60 connected to drop 44 powers up, a sign on command is sent from STB 60 to BDT 30. When BDT 30 receives the sign on request from STB 60, the sign on request includes the USAM and port number to which STB 60 is attached. BDT 30 then searches the customer profile for the franchise 38 associated with the received USAM and port number. Once the franchise 38 is determined, BDT 30 can establish soft PVC 54.

Figure 4:
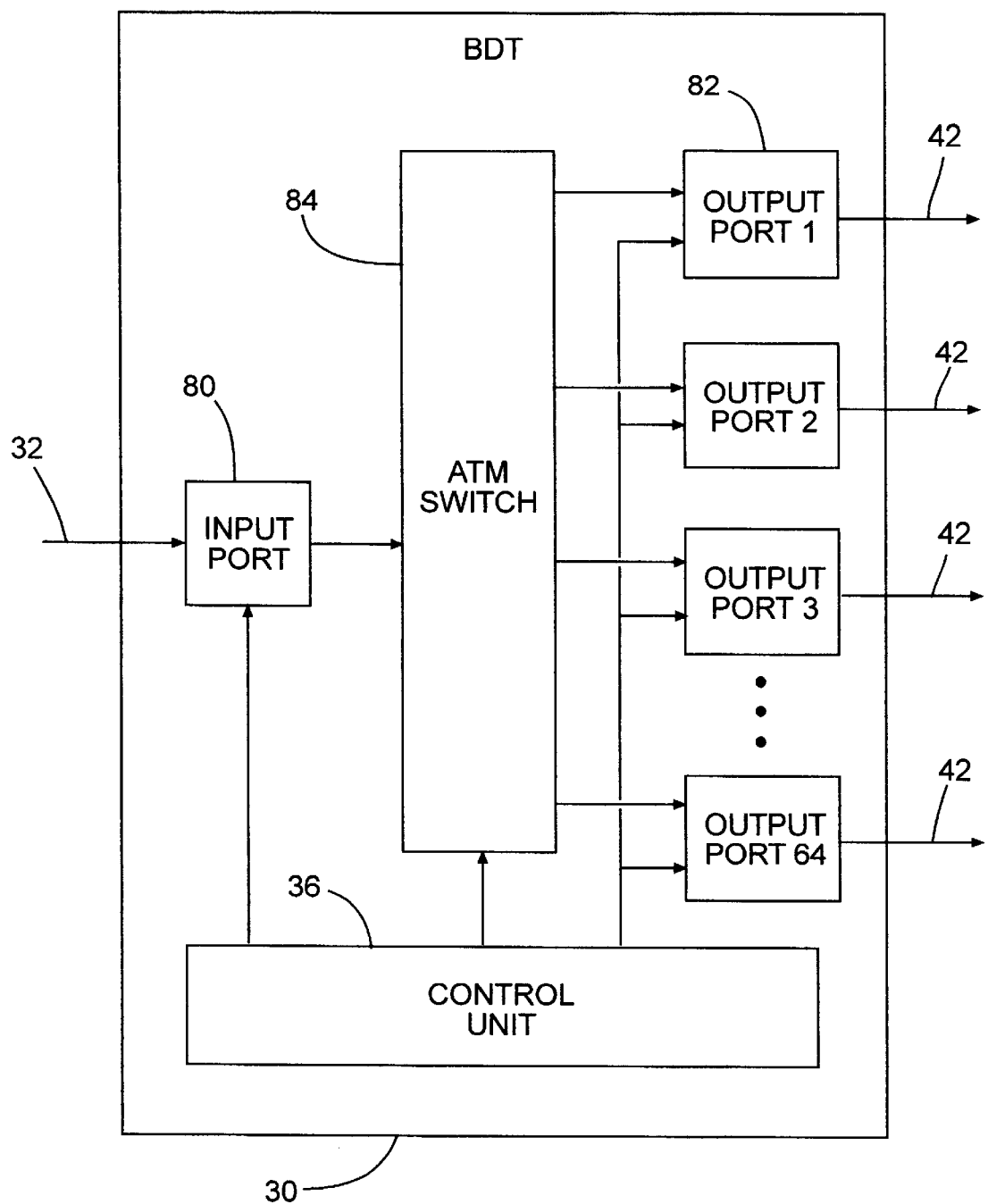
FIG. 4 is a block diagram of an embodiment of a BDT according to the present invention.

Referring now to FIG. 4, a block diagram of an embodiment of a BDT according to the present invention is shown. BDT 30 includes at least one input port 80 for connection to BDT link 32. Input port 80 supports a franchise PVC 50 for each provider and for each franchise 38 supported by BDT 30. BDT 30 includes one output port 82 for each ATM link 42. ATM switch 84 can form point-to-multipoint connections between input port 80 and one or more output ports 82 based on commands received from control unit 86. Control unit 86 holds the customer profiles. Control unit 86 receives a sign on request from requesting customer 36, determines to which franchise 38 requesting customer 36 belongs based on the sign on request, and sets ATM switch 84 to established soft PVC 54 between customer PVC 52 from customer 36 and franchise PVC 50 corresponding to the determined franchise 38.

While the best modes for carrying out the invention have been described in detail, those familiar with the art to which this invention relates will recognize various alternative designs and embodiments for practicing the invention as defined by the following claims.

What is claimed is:

1. A method for provisioning data from a data carousel in a head end of a broadband data distribution system covering a plurality of franchises wherein data destination is based on the franchise to which a customer belongs, the distribution system including at least one broadband digital terminal (BDT) in communication with the data carousel and in communication with the customer, the BDT operable to provide a connection between the data carousel and the customer, the method comprising:
    establishing a franchise permanent virtual circuit (PVC) between the data carousel and at least one BDT for each franchise served by the BDT, each franchise PVC carrying franchise-specific data;
    receiving a sign on request from the customer over a customer PVC between the customer and the BDT;
    determining to which franchise the customer belongs based on the sign on request; and
    establishing a soft PVC in the BDT between the customer PVC and the franchise PVC corresponding the determined franchise.

2. A method for provisioning data to a customer as in claim 1 wherein the data comprises at least one type of information from a set including an electronic programming guide (EPG) for each franchise; public, education, and government (PEG) programming information for each franchise; and pay-per-view (PPV) selections for each franchise.

3. A method for provisioning data to a customer as in claim 1 wherein the data is delivered through a set-top box (STB) within the customer premises, the data comprising at least one file to be downloaded to the STB, the at least one file based on the franchise to which the customer belongs.

4. A method for provisioning data to a customer as in claim 1 wherein the franchise PVC is identified by a unique franchise service handle.

5. A method for provisioning data to a customer as in claim 1 wherein the customer PVC is established through a universal access multiplexer (USAM) in communication with the at least one BDT, the customer connected to the USAM through a port having a port number, the method further comprising establishing a profile for each customer, the profile including the USAM and the port number to which the customer is connected associated with the franchise to which the customer belongs.

6. A method for provisioning data to a customer as in claim 5 wherein determining to which franchise the customer belongs comprises finding the profile containing the USAM and port number received in the sign on request.

7. A broadband system for provisioning data to customers, each customer belonging to a franchise, the system comprising:
    a head end including a data carousel, the data carousel providing franchise-based data; and
    at least one broadband digital terminal (BDT) in communication with the head end data carousel and in communication with customers served by the BDT, the BDT operative to
        (a) support a franchise permanent virtual circuit (PVC) between the data carousel and the BDT for each franchise served by the BDT,
        (b) establish a PVC between each customer served by the BDT and the BDT,
        (c) receive a sign on request from a requesting customer over the customer PVC between the requesting customer and the BDT,
        (d) determine to which franchise the requesting customer belongs based on the sign on request, and
        (e) establish a soft PVC in the BDT between the requesting customer PVC and the franchise PVC corresponding to the determined franchise.

8. A broadband system for provisioning data to customers as in claim 7 wherein the data comprises at least one type of information from a set including an electronic programming guide (EPG) for each franchise; public, education, and government (PEG) programming information for each franchise; and pay-per-view (PPV) selections for each franchise.

9. A broadband system for provisioning data to customers as in claim 7 wherein the data is delivered through a set-top box (STB) within the customer premises, the data comprising at least one file to be downloaded to the STB, the at least one file based on the franchise to which the customer belongs.

10. A broadband system for provisioning data to customers as in claim 7 wherein the franchise PVC is identified by a unique franchise service handle.

11. A broadband system for provisioning data to customers as in claim 7 further comprising at least one universal access multiplexer (USAM) in communication with the at least one BDT, the customer connected to the USAM through a port having a port number, the BDT further operable to establish a profile for each customer in communication with the BDT, the profile including the USAM and the port number to which the customer is connected associated with the franchise to which the customer belongs.

12. A broadband system for provisioning data to customers as in claim 11 wherein the BDT is further operative to determine to which franchise the customer belongs by finding the profile containing the USAM and port number received in the sign on request.

13. A broadband system for provisioning data to customers as in claim 11 further comprising a business system interface (BSI) in communication with the BDT, the BSI operative to transmit the customer profile to the BDT.

14. A broadband digital terminal (BDT) for provisioning franchise-dependent data to customers, each customer belonging to a franchise, the BDT comprising:
    at least one input port operative to support a franchise permanent virtual circuit (PVC) for each franchise served by the BDT, each PVC for receiving franchise-dependent data from a data carousel in a head end;

a plurality of output ports, each output port operative to support a plurality of customer PVCs, each customer PVC serving at least one customer;

an asynchronous transfer mode (ATM) switch operative to form a point-to-multipoint connection between the at least one input port and at least one output port; and a control unit in communication with the at least one input port, each output port, and the ATM switch, the control unit operative to
  (a) receive a sign on request from a requesting customer over the customer PVC,
  (b) determine to which franchise the requesting customer belongs based on the sign on request, and
  (c) set the ATM switch to establish a soft PVC between the requesting customer PVC and the franchise PVC corresponding to the determined franchise.

15. A BDT for provisioning data to customers as in claim 14 wherein the data comprises at least one type of information from a set including an electronic programming guide (EPG) for each franchise; public, education, and government (PEG) programming information for each franchise; and pay-per-view (PPV) selections for each franchise.

16. A BDT for provisioning data to customers as in claim 14 wherein the data is delivered through a set-top box (STB) within the customer premises, the data comprising at least one file to be downloaded to the STB, the at least one file based on the franchise to which the customer belongs.

17. A BDT for provisioning data to customers as in claim 14 wherein the franchise PVC is identified by a unique franchise service handle.

18. A BDT for provisioning data to customers as in claim 14 wherein at least one universal access multiplexer (USAM) is in communication with the at least one BDT, the customer connected to the USAM through a port having a port number, the BDT further comprising a database including a profile for each customer in communication with the BDT, the profile including the USAM and the port number to which the customer is connected associated with the franchise to which the customer belongs.

19. A broadband system for provisioning data to customers as in claim 18 wherein the control unit is further operative to receive the USAM and port number in the sign on request and to determine to which franchise the customer belongs by finding the profile containing the received USAM and port number.

* * * * *